US007633720B2

United States Patent
Matsui

(10) Patent No.: US 7,633,720 B2
(45) Date of Patent: Dec. 15, 2009

(54) DISK DRIVING APPARATUS WITH ENGAGEMENT MEMBER TO DETER HEAD FROM FALLING TO DISK

(75) Inventor: Kiyoto Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 11/513,733

(22) Filed: Aug. 31, 2006

(65) Prior Publication Data

US 2007/0070551 A1 Mar. 29, 2007

(30) Foreign Application Priority Data

Sep. 26, 2005 (JP) ............... 2005-278312

(51) Int. Cl.
*G11B 5/54* (2006.01)

(52) U.S. Cl. .................................. 360/255

(58) Field of Classification Search ................ 360/255, 360/255.2, 255.5
See application file for complete search history.

(56) References Cited

U.S. PATENT DOCUMENTS 5,550,695 A * 8/1996 Matsumoto .............. 360/254.4
5,764,437 A * 6/1998 Meyer et al. ............. 360/254.3
6,115,214 A * 9/2000 Allsup et al. ............. 360/254.3
6,487,050 B1 * 11/2002 Liu ........................ 360/254.8
6,538,851 B1 * 3/2003 Sasaki .................... 360/254.8
2004/0140795 A1 7/2004 Zayas et al.
2006/0268463 A1 * 11/2006 Ohwe ....................... 360/255

FOREIGN PATENT DOCUMENTS

JP 2004-206768 7/2004
JP 2005-032395 2/2005

* cited by examiner

*Primary Examiner*—David D Davis
(74) *Attorney, Agent, or Firm*—Greer, Burns & Crain, Ltd.

(57) ABSTRACT

A disk drive includes a rotatable disk, a read/write head, a head actuator for moving the head, a suspension for connecting the head and the actuator, and a housing for accommodating the disk, the head, the actuator and the suspension. The suspension is provided with a tab, and the housing is provided with an engaging element to come into engagement with the tab. Upon application of an impact to the housing, the head is raised unduly away from the disk. The tab is caught by the engaging element, thereby preventing the head from falling to and colliding with the disk.

6 Claims, 5 Drawing Sheets

FIG.5
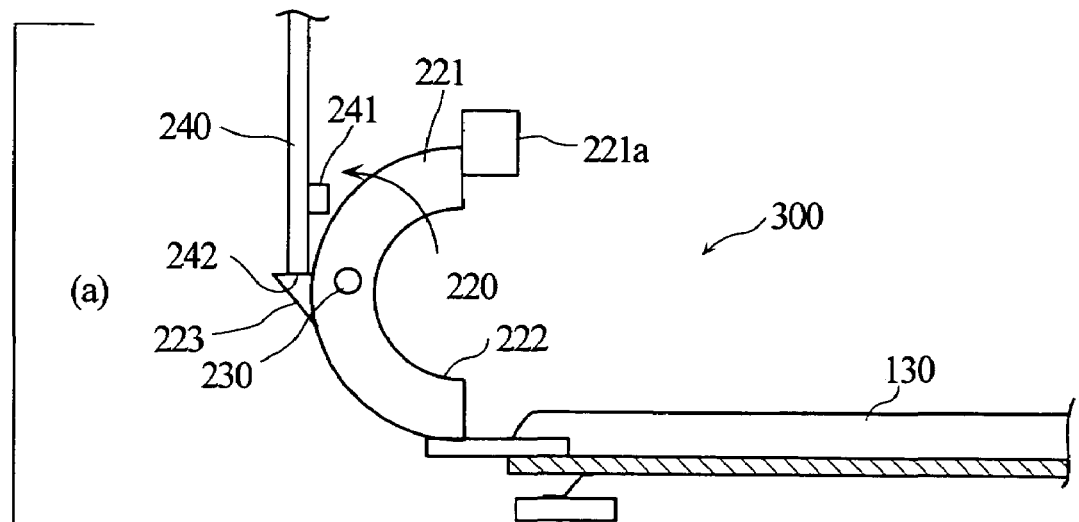
(a)
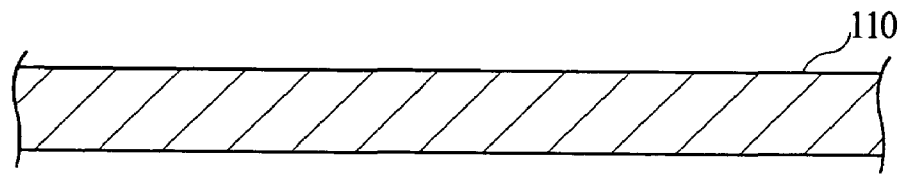
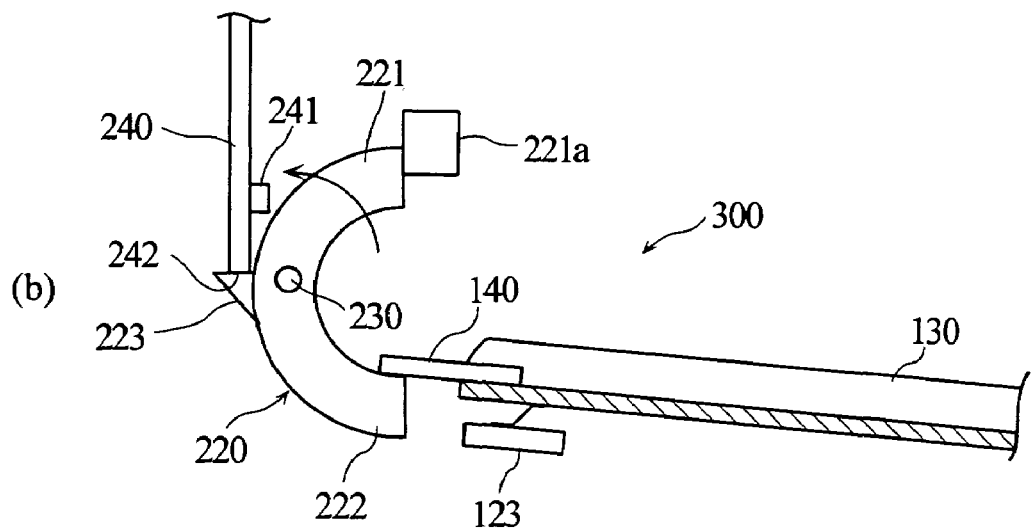
(b)
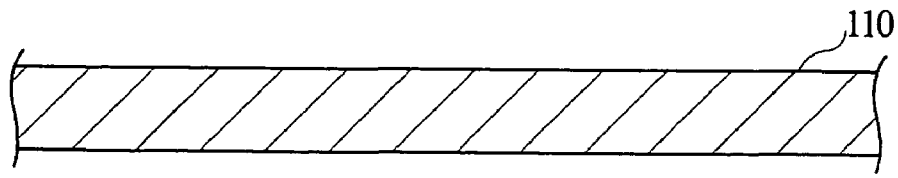

DISK DRIVING APPARATUS WITH ENGAGEMENT MEMBER TO DETER HEAD FROM FALLING TO DISK

BACKGROUND OF THE INVENTION

1. Field of the Invention

The present invention relates to a disk driving apparatus for recording and reproducing information in and from a disk-shaped recording medium such as a hard disk. In particular, the present invention relates to a disk driving apparatus with enhanced impact resistance.

2. Description of the Related Art

Hard disk driving apparatuses (simply called "disk drives" below) have been reduced in size, but improved in memory capacity. Recently, such a disk drive is employed as a storage unit in a mobile PC, and also as a recording unit for music, voice or images in a portable music player or a video camera (see Patent document 1 below).

Typically, a hard disk drive includes one or more disks rotatable at high speed, and a head that is held in contact with or slightly spaced from the disk surface (see Patent document 2 below). The head is supported by a head actuator for performing "seek" with respect to the disk.

As known in the art, the disk drive has a merit of quick access, in addition to the compactness and large recording capacity mentioned above. On the other hand, the disk drive is rather vulnerable to an impact due to the supporting structure: the head actuator is held in direct contact with or slightly spaced from the disk surface for information writing or reading. If a big shock is given to the hard disk drive when the head is on or adjacent to the disk, the head may collide with the disk, thereby destroying the data stored in the disk, or damaging the recording layer of the disk.

The impact resistance of the disk drive may be improved as the mass of the head actuator becomes smaller. Another way to improve the impact resistance of the disk drive is to increase the rigidity of a suspension used for urging the head toward the disk, or to strengthen or lighten the head actuator itself. It has been proved, however, that none of these measures is sufficient for absorbing a shock occurring when the disk drive falls onto the ground. There are some types of disk drives which are provided with a built-in acceleration sensor for detecting a fall of the apparatus. In such a disk drive, when the falling of the disk drive is detected, it is possible to move the head away from the disk. This system, however, requires an additional cost for the acceleration sensor and a control circuit associated with the sensor. Further, the system may be ineffective when the shock is inflicted too fast, i.e., before the system executes the control.

Patent document 1: JP-A-2004-206768.
Patent document 2: JP-A-2005-32395.

SUMMARY OF THE INVENTION

The present invention has been proposed in view of the foregoing situation. It is an object of the present invention to provide a disk drive that exhibits enhanced impact resistance when the apparatus falls or when something hard hits the apparatus.

According to the present invention, there is provided a disk drive comprising: a disk driven to rotate; ahead arranged adjacent to the disk; a head actuator that moves the head relative to the disk; a suspension that connects the head and the actuator to each other; and a housing that accommodates the disk, the head, the actuator and the suspension. The suspension is provided at an end thereof with a tab, and the housing is provided with an engaging element to come into engagement with the tab. The tab is caught by the engaging element for preventing the head from falling to the disk when the head is raised to a prescribed height from a surface of the disk upon application of an impact to the housing.

Preferably, the tab may be immovably attached to the suspension, while the engaging element may be movably attached to the housing. The engaging element may allow the tab to rise above the disk by a predetermined distance, and hold the tab, when the tab rises further than the predetermined distance. As a result, it is possible to prevent the head from falling to the disk.

Preferably, the engaging element may be pivotably supported by a shaft and include a first side and a second side that are opposite to each other with respect to the shaft. The first side may be greater in mass than the second side. The engaging element may pivot to cause the second side to hold the tab when the head and the tab rise above the disk upon application of an impact to the housing.

Preferably, the tab may be configured to tilt toward the disk from a predetermined normal posture extending with respect to the suspension, while the engaging element may be immovably attached to the housing. The tab may tilt to climb over the engaging element when the tab and the head rise upon application of an impact to the housing. Then, the tab may take the normal posture to be held by the engaging element after climbing over the engaging element.

Preferably, the tab may be urged to take the normal posture.

Preferably, the engaging element may extend along a trajectory of the tab produced when the head performs a seek with respect to the disk. The engaging element may terminate at a position radially outward of the disk.

The above and other features and benefits of the present invention will become more apparent from the detailed description given hereunder referring to the accompanying drawings.

BRIEF DESCRIPTION OF THE DRAWINGS

FIG. 5 is a schematic side views for explaining an operation according to the second embodiment.

DETAILED DESCRIPTION OF THE PREFERRED EMBODIMENTS

Preferred embodiments of the present invention will be described below with reference to the accompanying drawings. In these embodiments, the present invention is applied to a hard disk drive. However, this is merely an example of the application, to which the present invention is not limited.

Figure 1:
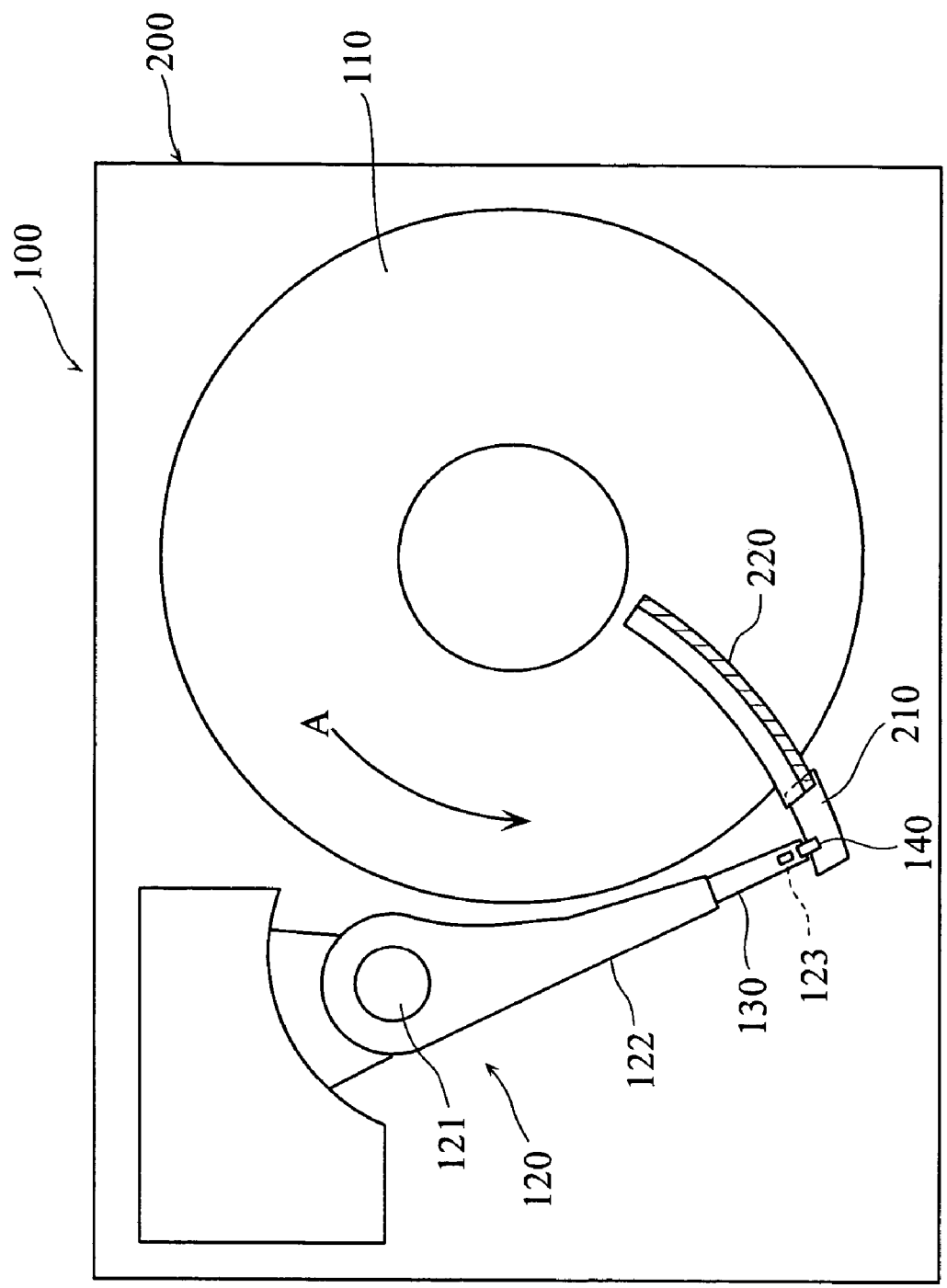
FIG. 1 is a plan view showing a disk drive according to a first embodiment of the present invention.

Reference is first made to FIG. 1 which illustrates the basic elements of a hard disk drive 100 according to a first embodiment of the present invention.

The disk drive 100 includes a box-shaped housing 200 in which a disk 110 is placed. The disk 110 is driven to rotate in a direction indicated by arrow A. A head actuator 120 is disposed by the side of the disk 110. The head actuator 120 includes an arm 122 driven to swing about a shaft 121 by a voice coil motor (VCM), for example. A read/write head 123 is attached to a tip portion of the arm 122.

Figure 2:
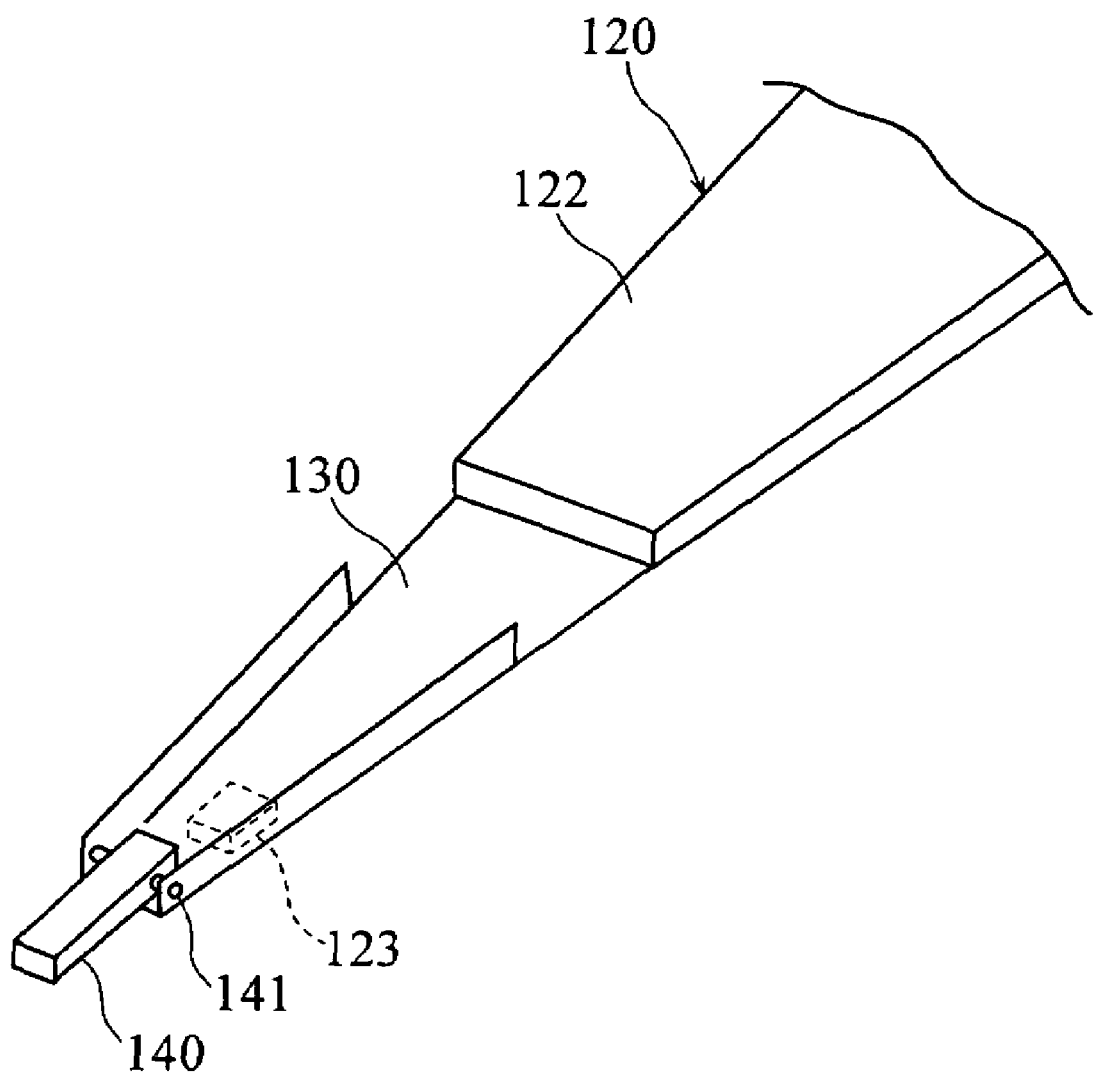
FIG. 2 is a perspective view showing a structure of a distal portion of a suspension according to the first embodiment.

As shown in FIG. 2, a suspension 130 is attached to the tip portion of the arm 122, and the head 123 is attached to the lower surface of the tip portion of the suspension 130. When located on the disk 110, the head 123 is pressed against the surface of the disk 110 by the biasing force of the suspension 130. When the disk 110 is driven to rotate, the head 123 may be held in direct contact with or slightly spaced away from the surface of the disk 110 for writing or reading information with respect to the disk 110. The swinging of the arm 122 moves the head 123 arcuately about the shaft 121. By this movement, the head 123 can perform a seek action or shift in position to take a stand-by position, which is arranged radially outward of the disk 110.

The suspension 130 is provided with a tab 140 which protrudes forward beyond the tip portion of the suspension, as shown in FIG. 2. The tab 140 is arranged to rest on a ramp 210 adjacent to the disk 110, when the arm 122 swings to bring the head 123 radially outward of the disk 110. In this manner, the head 123 is prevented from falling off the peripheral edge of the disk 110. Also, the head 123 can smoothly come out of and reenter into a desired access region on the disk 110.

Figure 3:
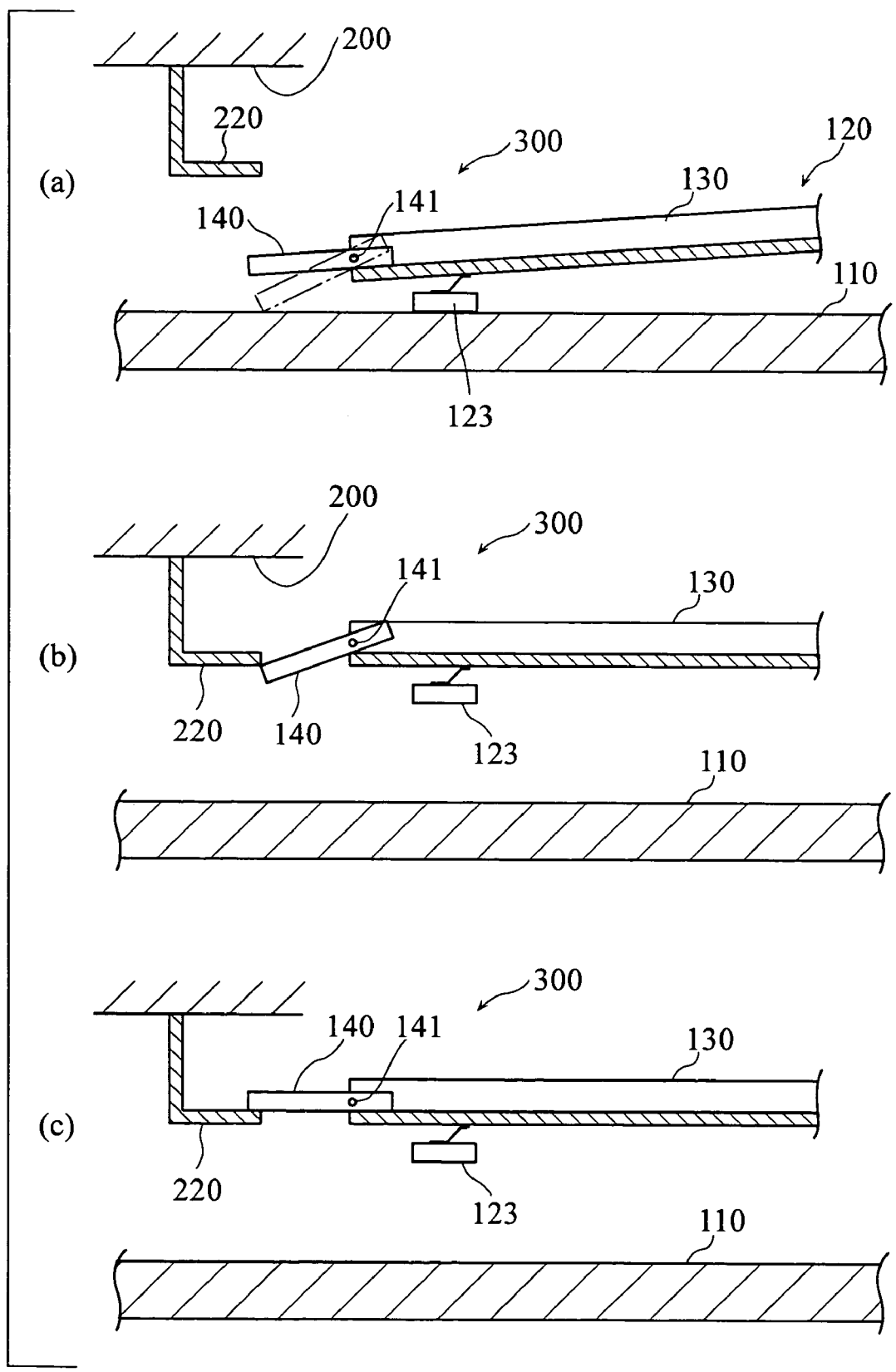
FIG. 3 is a schematic side view for explaining an operation according to the first embodiment.

The hard disk drive 100 according to the present invention includes a head arresting mechanism 300 to catch and hold the head 123 when the head 123 bounds upward from the disk 110. Referring to FIGS. 1 to 3, the head arresting mechanism 300 includes the tab 140 attached to the suspension 130. The tab 140, extending along an imaginary extension line of the suspension 130 (FIGS. 2 and 3(a)) in a normal state, is arranged to swing about a shaft 141. The tab 140 can pivot or tilt toward the disk 110 (see the dash-dot line in FIG. 3(a)) so that the tip portion thereof comes closer to the disk 110. The head arresting mechanism 300 also includes an engaging element 220 fixed to an inner surface of the housing 200 for engaging with the tab 140. According to the present invention, the tab 140 may be urged to return to the extending posture by a spring or the like. The tab 140 is not allowed to pivot in the opposite direction to the tilt direction (which is counterclockwise in FIG. 3(a)) beyond the predetermined, initial posture (depicted in solid lines in FIG. 3(a)). In the illustrated embodiment, the prevention of the opposite pivoting (or clockwise turning in FIG. 3(a)) beyond the initial posture is attained by causing the base end (the right end in FIG. 3(a)) to abut against the upper surface of the suspension 130. In addition, it is arranged that the tip portion of the tab 140 is located higher than the lower surface of the head 123 when the tab 140 takes the pivot position indicted by the dash-dot line in FIG. 3(a).

As shown in FIG. 1, the engaging element 220 extends along a range through which the tab 140 is to move, corresponding to a range through which the head 123 moves over the disk 110 by the swinging motion of the arm 122. Accordingly, the engaging element 220 has an arcuate edge extending along the moving path of the tab 140 and overlapping slightly with the tip portion of the tab 140 in a plan view (see FIG. 1).

With such structure, when the hard disk drive 100 falls on the floor during operation thus undergoing a strong impact, the head 123, disposed in contact with or slightly spaced from the disk 110 (FIG. 3(a)), is caused to move upward by the impact. The head 123 is raised to a higher position in proportion to the magnitude of the impact. At this stage, it is possible for the tab 140 to rise beyond or climb over the engaging element 220, since the tab 140 can tilt toward the disk 110 (FIG. 3(b)). Thereafter, the tab 140 is held immovable by the engaging element 220 (FIG. 3(c)). In this manner, although the head 123 is urged toward the disk 110 by the biasing force of the suspension 130, it is possible to prevent the head 123 from colliding with the disk 110.

In the above arrangement, the tab 140 may come close to the disk 110 upon impact (see FIG. 3(a)). Even in such an instance, the tab 140 does not come into contact with the disk 110 since the tip portion of the tab 140 remains above the lower surface of the head 123.

Swinging the arm 122 causes the tab 140 to slide toward outside of the disk 110, with the engagement between the tab 140 and the engaging element 220 maintained. Thus, in swinging the arm 122, the head 123 can be brought away from the disk 110 without contacting the surface of the disk 110. The tab 140 can be shifted from the edge of the arcuate engaging element 220 onto the ramp 210, which is located below the engaging element 220. This shift sets the head 123 in the stand-by position to be ready for new access to the surface of the disk 110.

Figure 4:
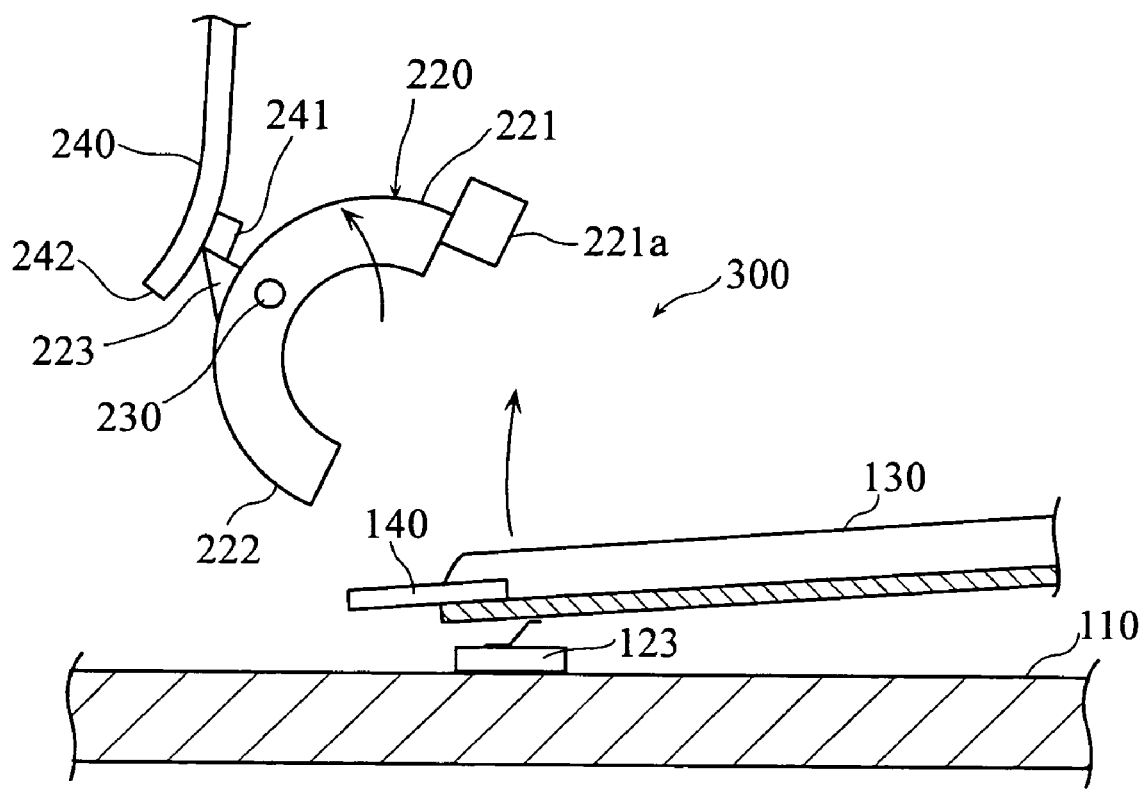
FIG. 4 is a schematic side view showing a structure according to a second embodiment of the present invention.

FIGS. 4, 5(a) and 5(b) depict a head arresting mechanism 300 used for a second embodiment of the present invention. In this embodiment, the tab 140 is immovably attached to the tip portion of the suspension 130 so that it does not pivot relative to the suspension 130, while the engaging element 220 is pivotably attached to the inner surface of the housing 200.

Specifically, the movable engaging element 220 has a C-shaped cross-section as shown in FIG. 4, and is swingable about a shaft 230 provided at a center of the engaging element 220. The engaging element 220 is also provided with a weight 221a attached to an upper end portion 221 above the shaft 230. Due to the weight 221a, the upper end portion is heavier than the lower end portion 222. The engaging element 220 further includes a projection at the back thereof.

In the second embodiment, a stopper 240 that is elastically deformable is attached to the housing 200. The stopper 240 includes a first stopper element 241 and a second stopper element 242 disposed at different heights.

In a normal condition, the engaging element 220 is set in an inclined posture with the projection 223 butted to the first stopper element 241, as shown in FIG. 4. This is because the engaging element 220 is about to rotate clockwise in FIG. 4 when inclined since the upper portion 221 is heavier, but is inhibited from rotating by the engagement of the projection 223 with the first stopper element 241. Here, the lower end portion of the engaging element 220 and the tab 140 are positioned so as to avoid interference when the tab 140 is raised.

When the hard disk drive 100 falls on the floor during operation thus undergoing a strong impact, the head 123 is caused to bound upward so as to float above the disk 110, and simultaneously the weight 221a on the upper portion 221 of the inclined engaging element 220 is subjected to an upward force, which causes the engaging element 220 to rotate counterclockwise (FIG. 5(a)). Upon such rotation, the projection 223 is latched by the second stopper element 242, thereby inhibiting the engaging element 220 from returning to the inclined posture. As shown in FIGS. 5(a) and 5(b), the lower end portion 222 of the engaging element 220 and the tab 140 are set to interfere after the rotation.

Accordingly, when an impact is put to the hard disk drive 100, the engaging element 220 is caused to rotate counterclockwise to take the posture shown in FIG. 5(a) before the head 123 floats above the disk 110 upon bounding. Thus, the tab 140 is butted to the lower surface of the lower end portion 222 of the engaging element 220, and this prevents the head 123 from rising further. In this case, although the head 123 will fall back onto the disk 110, the disk 110 is less likely to be damaged by the head 123, because the floating height of the head 123 is limited.

In another case, the head 123 bounds upward when the hard disk drive 100 is subjected to an impact, and then the engaging element 220 is caused to rotate counterclockwise. In this case, as shown in FIG. 5(*b*), the tab 140, which is about to return toward the disk 110, is detained by the upper surface of the lower end portion 222 of the engaging element 220. As a result, the head 123 is kept to be spaced from the disk 110 and does not collide with the disk 110 after the upward bounding.

To return the engaging element 220 to the normal state (shown in FIG. 4, where the projection 223 is butted to the first stopper element 241) from the aberrant state (shown in FIG. 5(*a*) or 5(*b*), where the projection 223 is butted to the second stopper element 242), the stopper unit 240 may be deformed by electrical (or electromagnetic) means so as to release the engagement between the second stopper element 242 and the projection 223.

The invention claimed is:

1. A disk drive comprising:
   a disk driven to rotate;
   a head arranged adjacent to the disk;
   a head actuator that moves the head relative to the disk;
   a suspension that connects the head and the actuator to each other, the suspension being provided with a tab at an end of the suspension;
   a first engaging element to hold the tab when the disk is unrotated;
   a second engaging element disposed above the disk; and
   a housing that accommodates the disk, the head, the actuator and the suspension;
   wherein the tab is caught by the second engaging element while the head is floating above the disk to deter the head from falling to the disk when the head is raised to a prescribed height from a surface of the disk upon application of an impact to the housing.

2. The disk drive according to claim 1, wherein the tab is immovably attached to the suspension and the second engaging element is movably attached to the housing, and wherein the second engaging element allows the tab to rise above the disk by a distance, and holds the tab, when the tab rises further than the distance, so that the head does not fall to the disk.

3. The disk drive according to claim 2, wherein the second engaging element is pivotably supported by a shaft and includes a first side and a second side that are opposite to each other with respect to the shaft, the first side being greater in mass than the second side, and wherein the second engaging element pivots to cause the second side to hold the tab when the head and the tab rise above the disk upon application of an impact to the housing.

4. The disk drive according to claim 1, wherein the tab is configured to tilt toward the disk from a normal posture extending with respect to the suspension, while the second engaging element is immovably attached to the housing, and wherein the tab tilts to climb over the second engaging element when the tab and the head rise upon application of an impact to the housing, the tab taking the normal posture and being held by the second engaging element after climbing over the second engaging element.

5. The disk drive according to claim 4, wherein the tab is urged to take the normal posture.

6. The disk drive according to claim 5, wherein the second engaging element extends along a trajectory of the tab produced when the head performs a seek with respect to the disk, the second engaging element terminating at a position radially outward of the disk.

\* \* \* \* \*